(12) United States Patent
Zhang et al.

(10) Patent No.: US 11,500,384 B2
(45) Date of Patent: Nov. 15, 2022

(54) METHOD AND SYSTEM FOR PATH PLANNING OF WAVE GLIDER

(71) Applicants: NATIONAL DEEP SEA CENTER, Shandong (CN); QINGDAO NATIONAL LABORATORY FOR MARINE SCIENCE AND TECHNOLOGY DEVELOPMENT CENTER, Shandong (CN)

(72) Inventors: Tongwei Zhang, Qingdao (CN); Lei Yan, Qingdao (CN); Haibing Li, Qingdao (CN); Xiujun Sun, Qingdao (CN); Xianglin Xu, Qingdao (CN); Jingxiao Liu, Qingdao (CN); Lei Yang, Qingdao (CN); Shengjie Qin, Qingdao (CN)

(73) Assignees: NATIONAL DEEP SEA CENTER, Shandong (CN); QINGDAO NATIONAL LABORATORY FOR MARINE SCIENCE AND TECHNOLOGY DEVELOPMENT CENTER, Shandong (CN)

( * ) Notice: Subject to any disclaimer, the term of this patent is extended or adjusted under 35 U.S.C. 154(b) by 323 days.

(21) Appl. No.: 16/849,284

(22) Filed: Apr. 15, 2020

(65) Prior Publication Data
US 2021/0286361 A1 Sep. 16, 2021

(30) Foreign Application Priority Data
Mar. 12, 2020 (CN) .......................... 202010169379.4

(51) Int. Cl.
*G05D 1/02* (2020.01)
*B63B 22/16* (2006.01)
(Continued)

(52) U.S. Cl.
CPC .......... *G05D 1/0206* (2013.01); *B63B 22/16* (2013.01); *B63G 8/001* (2013.01); *G01V 1/3835* (2013.01);
(Continued)

(58) Field of Classification Search
USPC .......................................................... 701/21
See application file for complete search history.

(56) References Cited

U.S. PATENT DOCUMENTS

2021/0286361 A1* 9/2021 Zhang .................. G01V 1/3835

FOREIGN PATENT DOCUMENTS

CN 111290435 A * 6/2020 ............. B63B 22/16

* cited by examiner

*Primary Examiner* — Tyler D Paige
(74) *Attorney, Agent, or Firm* — Ohlandt, Greeley, Ruggiero and Perle, LLP

(57) ABSTRACT

The invention relates to a method and system for path planning of a wave glider, comprising acquiring historical navigation data of the glider and an underwater vehicle via a shore-based monitoring center; fitting historical navigation data nonlinearly by a deep learning neural network to obtain a trained network; acquiring real-time navigation data of the glider at an off-line end, real-time navigation data and predetermined shipping track data of the vehicle; obtaining the set of off-line optimized path planning schemes of the glider by the above data and the trained network; and determining an optimal path planning scheme of the glider by the deep learning neural network according to real-time data and constraint data of the glider at the on-line end. The invention can reasonably plan the path of the glider and ensure continuous and reliable information interaction between the glider and the vehicle.

3 Claims, 4 Drawing Sheets

(51) Int. Cl.
  *B63G 8/00* (2006.01)
  *G01V 1/38* (2006.01)
  *G06N 3/08* (2006.01)
  *G06Q 10/08* (2012.01)
  *G08G 3/00* (2006.01)
(52) U.S. Cl.
  CPC ........... *G06N 3/08* (2013.01); *G06Q 10/0833* (2013.01); *G08G 3/00* (2013.01); *B63B 2213/02* (2013.01)

METHOD AND SYSTEM FOR PATH PLANNING OF WAVE GLIDER

CROSS REFERENCE TO RELATED APPLICATION

This application claims the benefit of priority of Chinese Patent Application No. 202010169379.4, entitled "Method and System for Path Planning of Wave Glider" filed with the China National Intellectual Property Administration on Mar. 12, 2020, which is incorporated herein by reference in its entirety.

TECHNICAL FIELD

The invention relates to the field of path planning of a wave glider, in particular to a method and system for path planning of the wave glider.

BACKGROUND ART

As an epoch-making marine autonomous observation platform in the field of marine equipment, the wave glider can perform long-term path tracking and position holding on a wide ocean (a maximum sailing distance is more than 10000 kilometers, and the continuous working time is more than 12 months) by fully utilizing environmental energy. Its peak power which is more than 80 watts, is completely meeting the requirement of information relay on power. Compared with a surface ship, an unmanned ship and a autonomous underwater vehicle, the wave glider has the characteristics of small volume, low cost and long period, and is very suitable to be used as a surface moving platform for assisting an underwater vehicle (AUV, Glider) to carry out low-cost and long-term collaborative navigation and positioning (the wave glider and the underwater vehicle are connected by means of underwater acoustic communication to provide distance information for assisting the navigation positioning of the underwater vehicle).

However, the average velocity of the wave glider is low, only about 1 knot or less, while the velocity of the underwater vehicle is usually two and more knots, which makes it impossible for the wave glider to follow the underwater vehicle synchronously. More importantly, the range of underwater acoustic communication is limited. Taking a 10 kHz frequency band as an example, its communication distance is less than 10 km. The higher the frequency band is, the shorter the communication distance is, which restricts the application of marine "light" equipment, i.e., wave glider to underwater collaborative navigation positioning.

Therefore, in order to construct the wave glider based on the marine "light" equipment-underwater vehicle collaborative navigation and positioning system, it is necessary to remedy a weakness of the wave glider having a slow velocity by effective technical means.

SUMMARY OF THE INVENTION

The invention intends to provide a method and system for path planning of a wave glider, which can reasonably plan the path of the wave glider to ensure continuous and reliable information interaction between the wave glider and an underwater vehicle.

In order to achieve the above object, the invention provides the following solutions:

A method for path planning of a wave glider comprises:
acquiring historical navigation data of the wave glider and an underwater vehicle by a shore-based monitoring center;
fitting the historical navigation data nonlinearly by adopting a deep learning neural network to obtain a trained deep neural network model;
acquiring real-time navigation data of the wave glider at an off-line end, real-time navigation data and predetermined shipping track data of the underwater vehicle;
obtaining a set of off-line optimized path planning schemes of the wave glider by adopting the trained deep neural network model according to the real-time navigation data of the wave glider at the off-line end, the real-time navigation data and the predetermined shipping track data of the underwater vehicle;
sending the set of off-line optimized path planning schemes of the wave glider determined at the shore-based monitoring center to the wave glider via a GPS or a cloud end;
acquiring real-time data of the wave glider at an on-line end and constraint data of the wave glider at the on-line end by the wave glider;
determining an optimal path planning scheme of the wave glider among the set of off-line optimized path planning schemes of the wave glider by the deep learning neural network, according to the real-time data of the wave glider at the on-line end and the constraint data of the wave glider at the on-line end; and
controlling the wave glider to sail according to the optimal path planning scheme of the wave glider.

Optionally, the fitting the historical navigation data nonlinearly by adopting a deep learning neural network to obtain a trained deep neural network model specifically comprises the steps of:
inputting the historical navigation data as a training set into the deep learning neural network;
acquiring path planning data of the wave glider or path planning data of an underwater vehicle;
inputting the path planning data of the wave glider or the path planning data of the underwater vehicle as constraint conditions into the deep learning neural network; and
updating parameters of the deep learning neural network by multiple iterations and learning to obtain a trained deep neural network model.

Optionally, the obtaining a set of off-line optimized path planning schemes of the wave glider by adopting the trained deep neural network model according to the real-time navigation data of the wave glider at the off-line end, the real-time navigation data and the predetermined shipping track data of the underwater vehicle specifically comprises the steps of:
constructing a test set of the wave glider according to the real-time navigation data of the wave glider at the off-line end;
constructing a test set of an underwater vehicle according to the real-time navigation data and the predetermined shipping track data of the underwater vehicle; and
inputting the test set of the wave glider and the test set of the underwater vehicle into the trained deep neural network model to obtain the set of off-line optimized path planning schemes of the wave glider.

Optionally, the acquiring real-time data of the wave glider at an on-line end and constraint data of the wave glider at the on-line end via the wave glider specifically comprises the steps of:
acquiring the real-time data of the wave glider at the on-line end, wherein the real-time data comprises actual navigation data of the wave glider, on-site sea condition information and actual navigation data of the underwater vehicle collected by the wave glider in real time; and acquiring the constraint data of the wave glider at the on-line end, wherein the constraint data comprises a distance between the wave glider and the underwater vehicle, and underwater acoustic communication conditions.

Optionally, the obtaining an optimal path planning scheme of the wave glider by the deep learning neural network, according to the real-time data of the wave glider at the on-line end, the constraint data of the wave glider at the on-line end and the set of off-line optimized path planning schemes of the wave glider specifically comprises the steps of:

taking the real-time data of the wave glider at on-line end as latest real-time data;

taking the constraint data of the wave glider at the on-line end as latest constraint conditions; and based on the latest real-time data and the latest constraint conditions, carrying out path planning scheme selection from the set of off-line optimized path planning schemes of the wave glider by utilizing the deep learning neural network to obtain the optimal path planning scheme of the wave glider.

Optionally, the method further comprises:

sending the optimal path planning scheme of the wave glider determined by the wave glider at the on-line end to the shore-based monitoring center via a GPS or a cloud end.

A system for path planning of a wave glider comprises:

a historical navigation data acquisition module configured to acquire historical navigation data of the wave glider and a underwater vehicle via a shore-based monitoring center;

a training module configured to fit the historical navigation data nonlinearly by adopting a deep learning neural network to obtain a trained deep neural network model;

a data acquisition module at an off-line end configured to acquire real-time navigation data of the wave glider at an off-line end, real-time navigation data and predetermined shipping track data of the underwater vehicle;

a determination module for a set of off-line optimized path planning schemes of the wave glider configured to obtain the set of off-line optimized path planning schemes of the wave glider by adopting the trained deep neural network model according to the real-time navigation data of the wave glider at the off-line end, the real-time navigation data and the predetermined shipping track data of the underwater vehicle;

a data transmission module configured to send the set of off-line optimized path planning schemes of the wave glider determined at the shore-based monitoring center to the wave glider via a GPS or a cloud end;

a data acquisition module at an on-line end configured to acquire real-time data of the wave glider at the on-line end and constraint data of the wave glider at the on-line end by the wave glider;

a determination module for an optimal path planning scheme of the wave glider configured to determine the optimal path planning scheme of the wave glider among the set of off-line optimized path planning schemes of the wave glider by the deep learning neural network, according to the real-time data of the wave glider at the on-line end and the constraint data of the wave glider at the on-line end; and a wave glider navigation module configured to control the wave glider to sail according to the optimal path planning scheme of the wave glider.

Optionally, the training module specifically comprises:

a first input unit configured to input the historical navigation data as a training set into the deep learning neural network;

an acquisition unit configured to acquire path planning data of the wave glider or path planning data of the underwater vehicle;

a second input unit configured to input the path planning data of the wave glider or the path planning data of the underwater vehicle as constraint conditions into the deep learning neural network; and a training unit configured to update parameters of the deep learning neural network by multiple iterations and learning to obtain a trained deep neural network model.

Optionally, the determination module for a set of off-line optimized path planning schemes of the wave glider specifically comprises:

a construction unit for a wave glider test set configured to construct a test set of the wave glider according to the real-time navigation data of the wave glider at the off-line end;

an construction unit for an underwater vehicle test set configured to construct a test set of the underwater vehicle according to the real-time navigation data and the predetermined shipping track data of the underwater vehicle; and a determination unit for a set of off-line optimized path planning schemes of the wave glider configured to input the test set of the wave glider and the test set of the underwater vehicle into the trained deep neural network model to obtain the set of off-line optimized path planning schemes of the wave glider.

Optionally, the data acquisition module at an on-line end specifically comprises:

a real-time data acquisition unit configured to acquire the real-time data of the wave glider at the on-line end, wherein the real-time data comprises actual navigation data of the wave glider, on-site sea condition information and actual navigation data of the underwater vehicle collected by the wave glider in real time; and a constraint data acquisition unit configured to acquire the constraint data of the wave glider at the on-line end, wherein the constraint data comprises a distance between the wave glider and the underwater vehicle, and underwater acoustic communication conditions.

According to the specific embodiment provided by the invention, the invention discloses the following technical effects:

According to the invention, the navigation path of the wave glider is planned. The distance between the wave glider and the underwater vehicle is ensured by reasonable path planning to be within a maximum operating distance range of underwater acoustic communication between the wave glider and the underwater vehicle, so as to ensure continuous and reliable information interaction between the wave glider and the underwater vehicle.

BRIEF DESCRIPTION OF THE DRAWINGS

In order to more clearly illustrate the embodiments of the present invention or technical solutions in the prior art, the accompanying drawings used in the embodiments will now be described briefly. It is obvious that the drawings in the following description are only some embodiments of the invention, and that those skilled in the art can obtain other drawings from these drawings without involving any inventive effort.

DETAILED DESCRIPTION OF THE INVENTION

In the following, the technical solutions in the embodiments of the present invention will be clearly and completely described with reference to the drawings in the embodiments of the present invention. Obviously, the described embodiments are only a part of the embodiments of the present invention, but not all the embodiments. Based on the embodiments of the present invention, all other embodiments obtained by a person of ordinary skill in the art without involving any inventive effort are within the scope of the present invention.

The invention intends to provide a method and system for path planning of a wave glider, which can reasonably plan the path of the wave glider to ensure continuous and reliable information interaction between the wave glider and an underwater vehicle.

To further clarify the above objects, features and advantages of the present invention, a more particular description of the invention will be rendered by reference to the appended drawings and specific embodiments thereof.

Figure 1:
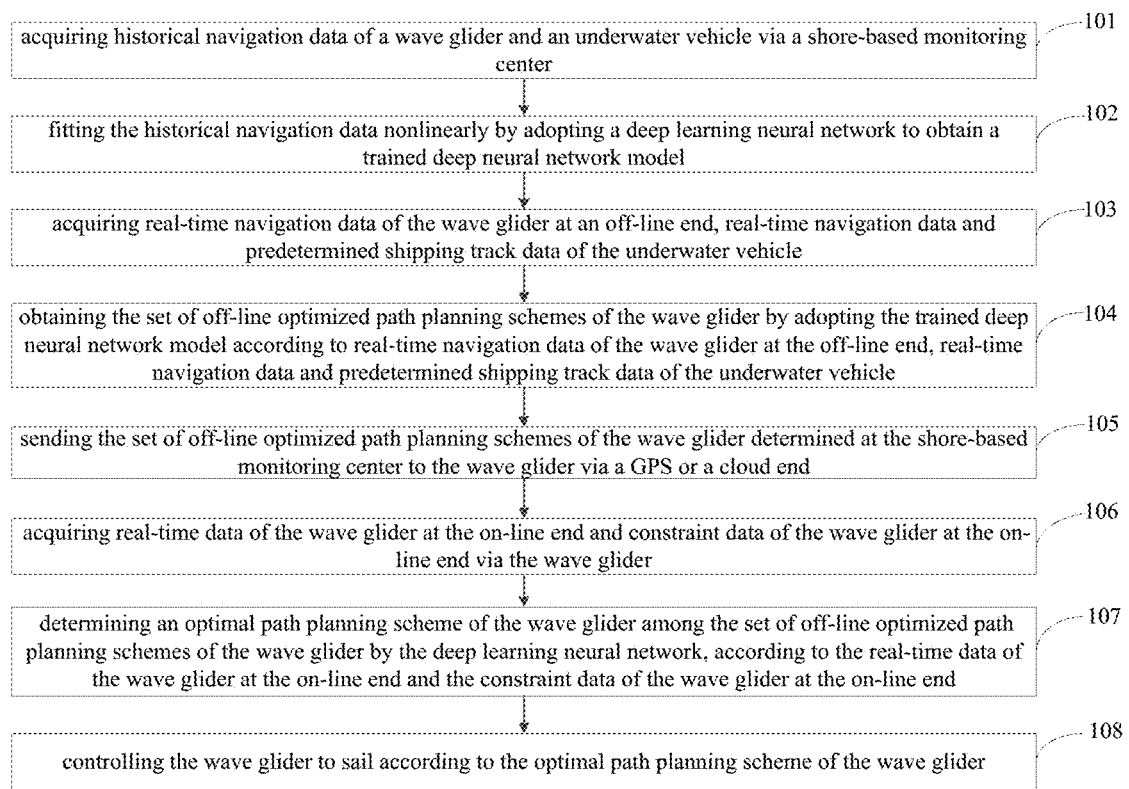
FIG. 1 is a flowchart of a method for a path planning of a wave glider according to Embodiment 1 of the present invention.

Embodiment 1:

FIG. 1 is a flowchart of a method for a path planning of a wave glider according to Embodiment 1 of the present invention. As shown in FIG. 1, the path planning method for the wave glider comprises the steps of:

Step 101: acquiring historical navigation data of the wave glider and the underwater vehicle via a shore-based monitoring center.

A large amount of historical data are obtained by analyzing the navigation information of the wave glider and the navigation information of the underwater vehicle in the past years via a shore-based monitoring center (an off-line end), and is standardized. The navigation information of the wave glider mainly comprises location information Location_before_WGlider, velocity information Velocity_before_WGlider and attitude (heading) information Heading_before_WGlider of the wave glider; and the navigation information of the underwater vehicle mainly comprises location information Location_before_AUV, velocity information Velocity_before_AUV, and attitude (heading) information Heading_before_AUV of the underwater vehicle. The historical data mainly refer to the past navigation information of a wave glider under the conditions of different sea areas, different sea conditions and the like, and the past navigation information of a underwater vehicle under the conditions of different sea areas, different sea conditions and the like. The historical data set may be represented as {Location_before_WGlider, Velocity_before_WGlider, Heading_before_WGlider, Location_before_AUV, Velocity_before_AUV, Heading_before_AUV}.

The navigation information of the wave glider can be sent to a shore-based monitoring center in real time via a satellite, and can also be stored on the wave glider so that it can be read out after tasks are completed and the wave glider is recycled. In either case, the navigation information of the wave glider remains intact. The navigation information of the underwater vehicle is mainly stored on the underwater vehicle, and can be read out after tasks are completed and the underwater vehicle is recycled. The underwater vehicle can also be periodically floated to the water surface and send the navigation information to a shore-based monitoring center in real time via a satellite. Since the wave glider and the underwater vehicle have performed a large number of voyage tasks, a large amount of historical navigation information {Location_before_WGlider, Velocity_before_WGlider, Heading_before_WGlider, Location_before AUV, Velocity before_AUV, Heading_before_AUV} is collected.

The wave glider timely sends location information Location_real_WGlier, velocity information Velocity_real_WGlier, attitude (heading) information Heading_real_WGlier of wave glider, and location information Location_real_AUV, velocity information Velocity_real_AUV, and attitude (heading) information Heading_real_AUV of the underwater vehicle to the shore-based monitoring center (the off-line end) by satellite communication; the shore-based monitoring center (the off-line end) receives the location information, the velocity information and the attitude (heading) information of the wave glider/underwater vehicle by satellite communication, acquires actual navigation data {Location_real_WGlier, Velocity_real_WGlier, Heading_real_WGlier, Location_real_AUV, Velocity_real_AUV, Heading_real_AUV}, and performs a standardization.

The location information Location_real_WGlider and the velocity information Velocity_real_WGlider of the wave glider are obtained by a satellite positioning system on the wave glider; the attitude (heading) information Heading_real_WGlier is measured by an attitude sensor on the wave glider. The location information Location_real_AUV and the velocity information Velocity_real_AUV of the underwater vehicle are given by an integrated navigation system, and the attitude (heading) information Heading_real_AUV is measured by the attitude sensor. The underwater vehicle sends the information to the wave glider on the water surface at a low update rate (for example, 15 minutes once) by underwater acoustic communication, and then the wave glider (the on-line end) sends the information to the shore-based monitoring center (the off-line end) via a GPS/a cloud end part.

The shore-based monitoring center (the off-line end) acquires predetermined shipping track data (or preset task conditions) of the wave glider and the underwater vehicle, and performs the standardization.

It should be noted that the satellite communication between the wave glider and the shore-based monitoring center is not real-time and the frequency of the communication is not very high, the communication is usually carried out often at intervals, such as three hours, due to limitations of energy and communication bandwidth of a satellite, cost, etc.

Step 102: fitting the historical navigation data nonlinearly by adopting a deep learning neural network to obtain a trained deep neural network model specifically comprises the steps of:

inputting the historical navigation data as a training set into the deep learning neural network;

acquiring path planning data of the wave glider or path planning data of an underwater vehicle;

inputting the path planning data of the wave glider or the path planning data of the underwater vehicle as constraint conditions into the deep learning neural network; and updating parameters of the deep learning neural network by multiple iterations and learning to obtain a trained deep neural network model.

A deep convolutional neural network consists of multi-layer nonlinear arithmetic units, which can automatically learn complex and high-dimensional nonlinear feature maps from a large number of training data. The historical navigation data (position, velocity, attitude (heading)) of the wave glider were subjected to nonlinear fitting by the deep learning neural network. The above process specifically comprises:

1. the construction process of the training set data: taking the historical navigation data of the wave glider/underwater vehicle as a training set. The training set is composed of historical navigation information {Location_before_WGlider, Velocity_before_WGlider, Heading_before_WGlider, Location_before_AUV, Velocity_before_AUV, Heading_before_AUV}.

As a preferred embodiment, the construction process of the training set is as follows: (1) dividing the historical navigation information of the wave glider {Location_before_WGlider, Velocity_before_WGlider, Heading_before_WGlider} and the historical navigation information of the underwater vehicle {Location_before AUV, Velocity_before_AUV, Heading_before_AUV} into two types; (2) eliminating jumping points from the two types of historical navigation information respectively so as to ensure rationality of the data; (3) respectively carrying out time alignment on the historical navigation information after the jumping points are eliminated to ensure that moments of position, velocity and attitude (heading) are completely consistent; (4) then carrying out smooth filtering on the processed historical navigation information to ensure that the data is continuous and smooth; (5) classifying data of different voyages, different sea conditions and different shipping tracks respectively, and classifying similar data into a class; and (6) on this basis, forming different training sets S_Wglider and S_AUV finally.

2. An off-line deep neural network training process: (1) sequentially inputting the processed training set data of the time sequence wave glider/underwater vehicle S_Wglider and S_AUV into the deep learning neural network; (2) automatically learning complex and high-dimensional nonlinear feature maps T Wglider and T_AUV from a large amount of training data by the deep learning neural network composed of multi-layer nonlinear arithmetic units; (3) inputting the path planning data of the wave glider/underwater vehicle G_Wglider and G_AUV (which are set before the voyage mission) used as constraint conditions into the deep learning neural network; (4) under the constraint conditions, updating parameters of the deep learning neural network through multiple iterations and learning by the deep learning neural network, selecting an optimal stepping scheme set according to an optimization function, and completing the training process of off-line deep neural network.

Step 103: acquiring real-time navigation data of the wave glider at an off-line end, real-time navigation data and predetermined shipping track data of the underwater vehicle;

Step 104: obtaining a set of off-line optimized path planning schemes of the wave glider by adopting the trained deep neural network model according to the real-time navigation data of the wave glider at the off-line end, the real-time navigation data and the predetermined shipping track data of the underwater vehicle specifically comprises the steps of:

constructing a test set of the wave glider according to the real-time navigation data of the wave glider at the off-line end;

constructing a test set of an underwater vehicle according to the real-time navigation data and the predetermined shipping track data of the underwater vehicle; and inputting the test set of the wave glider and the test set of the underwater vehicle into the trained deep neural network model to obtain the set of off-line optimized path planning schemes of the wave glider.

By utilizing the trained deep neural network, combined with the real-time navigation data of the wave glider/underwater vehicle and the predetermined shipping track (or preset task condition) data of the underwater vehicle, massive optimal path planning schemes of the wave glider under corresponding constraint conditions are generated.

1. Construction process of test set data is as follows: taking the real-time navigation data of the wave glider/underwater vehicle and the predetermined shipping track (or preset task condition) data of the underwater vehicle as the test set. The predetermined track (or preset mission condition) data of the underwater vehicle is formulated according to the mission condition before the start of the voyage, generally not adjusted, and reformulated by voyage personnel when meeting special conditions. Other test sets are composed of actual navigation data of the wave glider {Location_real_WGlider, Velocity_real_WGlier, Heading_real WGlider} and actual navigation data of the underwater vehicle {Location_real_AUV, Velocity_real_AUV, Heading_real_AUV} obtained at real-time.

The construction process of the test set of the wave glider is as follows: (1) obtaining actual navigation data of the wave glider in real time via a satellite positioning system and an attitude sensor; (2) sending actually measured navigation data of the wave glider to a shore-based monitoring center in real time via a satellite communication system; (3) carrying out data processing and quality control (eliminating jumping points, smoothing, filtering and the like) on the above measured navigation data of the wave glider by the bank-based monitoring center to generate a usable wave glider test set F_Wglider.

The construction process of the underwater vehicle test set is as follows: (1) obtaining actual navigation data of the underwater vehicle in real time by a combined navigation positioning system; (2) sending the actual measured navigation data of the underwater vehicle to the wave glider on the water surface by an underwater acoustic communication system; (3) transmitting the data to a shore-based monitoring center in real time via a satellite communication system, after receiving the data by the wave glider; (4) carrying out data processing and quality control (eliminating jumping points, smoothing, filtering and the like) on the actual measured navigation data of the underwater vehicle by the shore-based monitoring center to generate a usable underwater vehicle test set F_AUV.

2. Generating process of massive path planning schemes of the wave glider is as follows: (1) taking the test set of the wave glider F_Wglider and the test set of the underwater vehicle F_AUV as latest constraint conditions; (2) further optimizing the generated optimal stepping scheme set under the above constraint conditions; (3) generating massive optimal path planning schemes of the wave glider.

Figure 2:
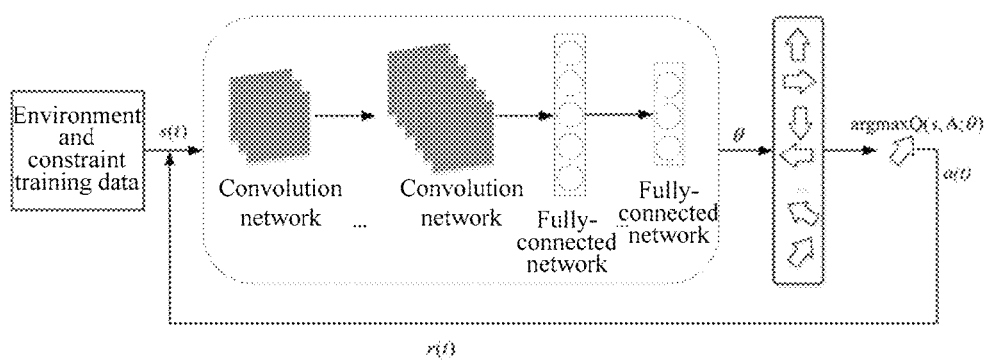
FIG. 2 is a schematic diagram of a design of an off-line optimal path planning scheme according to Embodiment 1 of the present invention.

The input states of the wave glider at the moment $t \in [0, 1, \ldots, t, \ldots, T]$ is $s(t) \in S$, wherein $S = C^0 \times C^1 \times \ldots$ is a constraint state set of the wave glider, and C represents the input states indicated by constraints such as observability of the wave glider, movement position state of the wave glider, working model and position of the underwater vehicle. The state of the wave glider at the moment t is $\alpha(t) \in A$, wherein, $A = F^0 \times F^1 \times \ldots$, represents the stepping state of the wave glider, the network parameters $\theta$ are updated by multiple iterations and learning according to s(t), $\alpha(t)$ and a decision-making return value r(t) for each action; selecting an optimal stepping scheme set according to the optimization function $Q(s,A;\theta)$. Given that a communication frequency of the wave glider is fcom, a sampling frequency of the off-line training data is fdata, fcom=fdata/T, and the optimal path $p=\alpha(1) \rightarrow \alpha(2) \ldots \rightarrow \alpha(t) \ldots \rightarrow \alpha(T)$ is obtained within a time length of 1/fcom according to accumulation of stepwise motion output $\alpha(t)$ The steps 101-104, as the design of the off-line optimal path planning scheme of the wave glider, are completed at the shore-based monitoring center (the off-line end). FIG. 2 is a schematic diagram of a design of an off-line optimal path planning scheme according to Embodiment 1 of the present invention.

Step 105: sending the set of off-line optimized path planning schemes of the wave glider determined at the shore-based monitoring center to the wave glider via a GPS or a cloud end;

The step 105 is performed at a GPS or cloud end, which is a bridge connecting the shore-based monitoring center (the off-line end) and the wave glider (the on-line end).

The GPS or cloud end is used for storing the path planning schemes designed by the shore-based monitoring center (the off-line end), transmitting the path planning schemes to the wave glider (the on-line end) for selecting the path planning scheme by the wave glider (the on-line end).

The GPS or cloud end is used for feeding evaluation data of the wave glider (the on-line end) back to the shore-based monitoring center (the off-line end), wherein the evaluation data mainly refer to the actual path of the wave glider, the actual path of the underwater vehicle, the distance between the two, the underwater acoustic communication conditions, the actual sea conditions and the like, and are used for evaluating the effect of path planning of the wave glider.

The satellite communication between the wave glider and the shore-based monitoring center is not real-time due to limitations of energy sources, communication bandwidth of a satellite, cost and the like, the frequency of the communication is not very high, and the communication is usually carried out at intervals, such as 3 hours. Therefore, the path planned by the shore-based monitoring center (the off-line end) is not real-time, but with a large number of alternative path planning schemes, which requires the wave glider (the on-line end) to select the optimal path planning scheme in the site by combining the real-time data with constraints.

Figure 3:
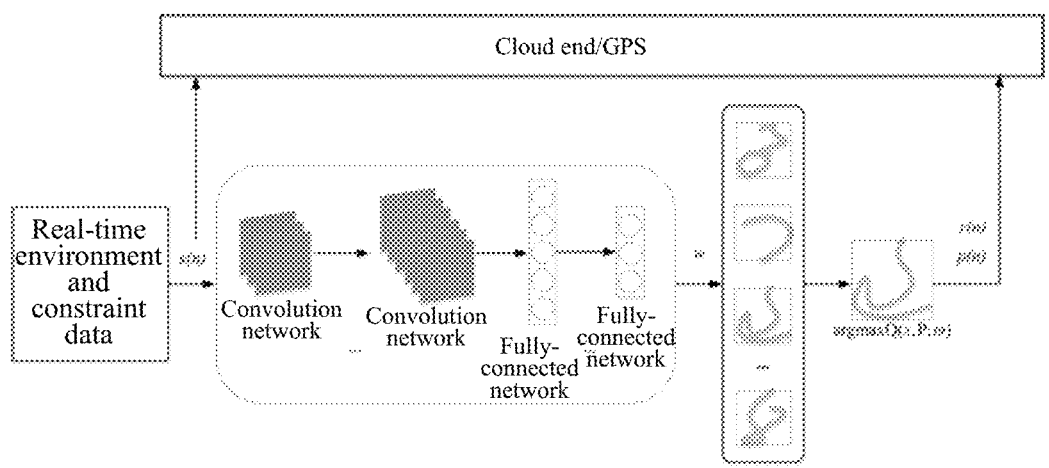
FIG. 3 is a schematic diagram of selection of a path scheme of a wave glider based on deep learning according to Embodiment 1 of the present invention.

The steps of 106-108 are performed at the wave glider (the on-line side) primarily for selecting an on-line optimal path planning scheme. FIG. 3 is a schematic diagram of selection of a path scheme of a wave glider based on deep learning according to Embodiment 1 of the present invention.

Step 106: the acquiring real-time data of the wave glider at an on-line end and constraint data of the wave glider at the on-line end by the wave glider specifically comprises the steps of:

acquiring the real-time data of the wave glider at the on-line end, wherein the real-time data comprises actual navigation data of the wave glider, on-site sea condition information and actual navigation data of the underwater vehicle collected by the wave glider in real time; and acquiring the constraint data of the wave glider at the on-line end, wherein the constraint data comprises a distance between the wave glider and the underwater vehicle, and underwater acoustic communication conditions.

The collection process of real-time data and constraint data is the same as the construction process of the above test set data, except that the data is required to be sent to the shore-based monitoring center by the satellite communication in the construction process of the above test set data, and in the real-time data and constraint data collection process, the process is completed at the wave glider (the on-line end) without sending the data to the shore-based monitoring center.

The specific process of real-time data collection is as follows: (1) collecting actual navigation data of the wave glider {Location_real_WGlier, Velocity_real_WGlier, Heading_real WGlier} by the wave glider in real time, which are respectively obtained by a satellite positioning system and an attitude sensor; (2) obtaining an on-site sea condition information SeaState by sensors such as a temperature sensor, a current meter and a weather meter on the wave glider; (3) collecting actual navigation data of the underwater vehicle {Location_real_AUV, Velocity_real_AUV, Heading_real_AUV} by the underwater vehicle in real time, which are provided by an integrated navigation system on the underwater vehicle; (4) sending the above actual navigation data of the underwater vehicle to the wave glider at a low update rate (for example, once in 15 minutes) via an underwater acoustic communication system; (5) processing the above data and controlling the quality of the above data (eliminating jumping points, smoothing and filtering, etc.) by the wave glider to generate usable real-time data R WGlider and R AUV.

The specific collection process of constraint data is as follows: the constraint data mainly refer to a distance between the wave glider and the underwater vehicle, the underwater acoustic communication conditions (the performance of an underwater acoustic communicator, environmental noises, underwater acoustic environment and the like) and the wave glider can acquire the relevant constraint data in real time. (1) calculating the distance between the wave glider and the underwater vehicle by utilizing the real-time data collected before, wherein the distance between the wave glider and the underwater vehicle is required to be smaller than the maximum operating distance range of the underwater acoustic communication, leaving a certain margin, such as 80% of the maximum operating distance of the underwater acoustic communication, that is, a first constraint condition Constraint_Range is constructed; (2) obtaining the underwater acoustic communication conditions (performance of underwater acoustic communicator, environmental noises, underwater acoustic environment, etc.) by real-time measurement and evaluation of the underwater acoustic communicator on the wave glider to construct a second constraint condition Constraint_Comm.

Step 107: the determining an optimal path planning scheme of the wave glider among the set of off-line optimized path planning schemes of the wave glider by the deep learning neural network, according to the real-time data of the wave glider at the on-line end and the constraint data of the wave glider at the on-line end specifically comprises the steps of:

taking the real-time data of the wave glider at on-line end as latest real-time data;

taking the constraint data of the wave glider at the on-line end as latest constraint conditions; and based on the latest real-time data and the latest constraint conditions, carrying out path planning scheme selection from the set of off-line optimized path planning schemes of the wave glider by utilizing the deep learning neural network to obtain the optimal path planning scheme of the wave glider.

Unlike the shore-based monitoring center (the off-line end), it is necessary to improve the speed of decision-making and the computing power of portable equipment in the design of wave glider (the on-line end) neural network. During the process of determining path schemes, the processed time sequence training set data is input into the deep learning neural network in sequence. When designing the main neural network, the Embodiment intends to adopt the means of constructing price function to balance the relationship between the deep learning neural network for decision-making, and operational capability and storage capability of the wave glider (the on-line end) system. There are not only integer variables such as number of hidden layers, number of neural units in the hidden layers, scale of prediction windows, but also continuous variables such as neuron weight values in the price function, so the optimization problem is a non-convex integer mix-optimization problem. This problem is solved based on an artificial bee colony optimization algorithm framework. The application of the artificial bee colony algorithm can dynamically optimize the deep learning neural network instead of the traditional static network parameter optimization method so as to improve the usability of the deep learning neural network at the on-line end of the wave glider.

Step 108: controlling the wave glider to sail according to the optimal path planning scheme of the wave glider. According to the path scheme selected by the deep learning neural network, the attitude (heading), the velocity and the like of the wave glider are adjusted in time to sail according to the path scheme. Meanwhile, the wave glider monitors its navigation conditions, sea conditions, and navigation conditions of the underwater vehicle in real time.

The method for path planning of the wave glider in the present disclosure further comprises the steps of:

sending the optimal path planning scheme of the wave glider determined by the wave glider at the on-line end to the shore-based monitoring center via a GPS or a cloud end. Specifically, the wave glider periodically (e.g., 3 hours once) transmits the decision-related data {s(n), p(n), r(n)} back to the shore-based monitoring center (the off-line end) via the GPS/cloud end for updating the path scheme of the shore-based monitoring center (the off-line end).

Due to the fact that the velocity of the wave glider is lower than that of the underwater vehicle, the wave glider cannot follow the underwater vehicle synchronously. The operating range of underwater acoustic communication is limited. If reasonable path planning is not carried out on the wave glider, the distance between the wave glider and the underwater vehicle can easily exceed the distance of underwater acoustic communication, so that continuous and reliable information interaction between the wave glider and the underwater vehicle cannot be maintained, causing an underwater collaborative navigation positioning failure of the wave glider, the underwater acoustic communicator and the underwater vehicle.

In view of the above problems, the present invention provides corresponding solutions. According to the navigation information of the wave glider and the navigation information of the underwater vehicle in the past years, the actual path information (location information, velocity information, attitude (heading) information) of the wave glider and the actual path information (location information, velocity information, attitude (heading) information) of the underwater vehicle, the path planning is carried out by utilizing a deep learning neural network to generate a multi-constraint and multi-information fused path scheme.

If the above-described deep-learning-based path scheme design is performed directly on the wave glider, the amount of computation required far exceeds the computational power of the wave glider. Therefore, the whole path planning problem is divided into two parts: the path planning design of the shore-based monitoring center (the off-line end) and the path planning selection of the wave glider (the on-line end). The path planning and design work of the main calculation workload is completed by the shore-based monitoring center (the off-line end); the path selection with less computational effort is done by the wave glider (the on-line end). Therefore, the path planning scheme design part and the scheme selection part are connected via the cloud end, so that the operation load of the on-line end of the wave glider can be greatly reduced, solving the problem that the satellite communication is not timely between the wave glider and the shore-based monitoring center and improving the operability of the algorithm in practical application.

In addition, in the present disclosure the optimal path planning scheme of the wave glider determined by the wave glider at the on-line end is sent to the shore-based monitoring center via a GPS (global positioning system) or a cloud end, and the function of path evaluation data return is added for timely adjusting the path planning design of the shore-based monitoring center (the off-line end) and the path planning selection of the wave glider (the on-line end) according to the wave glider, the underwater vehicle, the actual sea condition and the like, so as to ensure continuous and reliable information interaction between the wave glider and the underwater vehicle.

Figure 4:
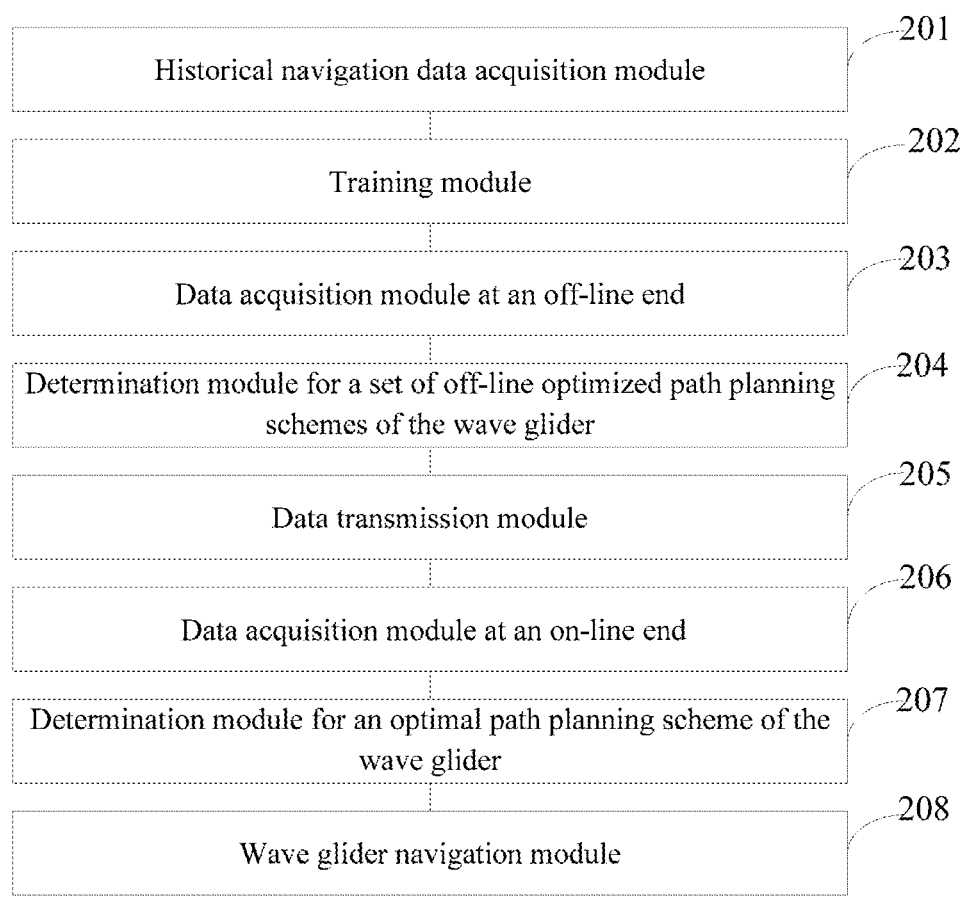
FIG. 4 is a structural diagram of a system for a path planning of a wave glider according to Embodiment 2 of the present invention.

Embodiment 2:

The invention also provides a system for path planning of the wave glider corresponding to the method for path planning of the wave glider provided by the invention, and FIG. 4 is a structural diagram of a system for a path planning of a wave glider according to Embodiment 2 of the present invention. As shown in FIG. 4, the system for path planning of the wave glider comprises:

a historical navigation data acquisition module 201 configured to acquire historical navigation data of the wave glider and a underwater vehicle via a shore-based monitoring center;

a training module 202 configured to fit the historical navigation data nonlinearly by adopting a deep learning neural network to obtain a trained deep neural network model;

a data acquisition module at an off-line end 203 configured to acquire real-time navigation data of the wave glider at an off-line end, real-time navigation data and predetermined shipping track data of the underwater vehicle;

a determination module 204 for a set of off-line optimized path planning schemes of the wave glider configured to obtain the set of off-line optimized path planning schemes of the wave glider by adopting the trained deep neural network model according to the real-time navigation data of the wave glider at the off-line end, the real-time navigation data and the predetermined shipping track data of the underwater vehicle;

a data transmission module 205 configured to send the set of off-line optimized path planning schemes of the wave glider determined at the shore-based monitoring center to the wave glider via a GPS or a cloud end;

a data acquisition module at an on-line end 206 configured to acquire real-time data of the wave glider at the on-line end and constraint data of the wave glider at the on-line end via the wave glider;

a determination module 207 for an optimal path planning scheme of the wave glider configured to determine the optimal path planning scheme of the wave glider among the set of off-line optimized path planning schemes of the wave glider by the deep learning neural network, according to the real-time data of the wave glider at the on-line end and the constraint data of the wave glider at the on-line end; and a wave glider navigation module 208 configured to control the wave glider to sail according to the optimal path planning scheme of the wave glider.

The training module 202 specifically comprises:

a first input unit configured to input the historical navigation data as a training set into the deep learning neural network;

an acquisition unit configured to acquire path planning data of the wave glider or path planning data of the underwater vehicle;

a second input unit configured to input the path planning data of the wave glider or the path planning data of the underwater vehicle as constraint conditions into the deep learning neural network; and a training unit configured to update parameters of the deep learning neural network by multiple iterations and learning to obtain a trained deep neural network model.

The determination module 204 for a set of off-line optimized path planning schemes of the wave glider specifically comprises:

a construction unit for a wave glider test set configured to construct the wave glider test set according to the real-time navigation data of the wave glider at the off-line end;

an construction unit for an underwater vehicle test set configured to construct a test set of the underwater vehicle according to the real-time navigation data and the predetermined shipping track data of the underwater vehicle; and a determination unit for a set of off-line optimized path planning schemes of the wave glider configured to input the test set of the wave glider and the test set of the underwater vehicle into the trained deep neural network model to obtain the set of off-line optimized path planning schemes of the wave glider.

The data acquisition module 206 at an on-line end specifically comprises:

a real-time data acquisition unit configured to acquire the real-time data of the wave glider at the on-line end, wherein the real-time data comprises actual navigation data of the wave glider, on-site sea condition information and actual navigation data of the underwater vehicle collected by the wave glider in real time; and a constraint data acquisition unit configured to acquire the constraint data of the wave glider at the on-line end, wherein the constraint data comprises a distance between the wave glider and the underwater vehicle, and underwater acoustic communication conditions.

According to the invention, the method for path planning of wave glider is divided into two parts: an off-line path design and an on-line optimization decision; a deep learning neural network is introduced to deal with the problem of multi-constraint and multi-information fusion in path planning of the wave glider; the path planning scheme design part and the scheme selection part are connected via a cloud end or a GPS, so that the online operation load of the wave glider can be greatly reduced, and the operability of the algorithm in practical application is improved.

In this specification, various embodiments have been described in an incremental manner, with each embodiment being described with emphasis on differences from the other embodiments, and the same and similar parts among the various embodiments can be referred to each other. For the system disclosed by the embodiment, since the system corresponds to the method disclosed by the embodiment, the description is relatively simple, and the relevant parts can be explained with reference to the portion of the method.

The principles and implementation of the present invention have been described herein with specific examples, and the above embodiments are presented to aid in the understanding of the methods and core concepts of the present invention; at the same time, changes will occur to those skilled in the art in both the detailed description and the scope of application according to the teachings of this invention. In conclusion, the contents of the description should not be construed as limiting the invention.

What is claimed is:

1. A method for path planning of a wave glider, comprising:

acquiring historical navigation data of the wave glider and an underwater vehicle by shore-based monitoring center;

fitting, by the shore-based monitoring center, the historical navigation data nonlinearly by adopting a deep learning neural network to obtain a trained deep neural network model; wherein fitting the historical navigation data nonlinearly by adopting the deep learning neural network to obtain the trained deep neural network model comprises:

inputting the historical navigation data as a training set into the deep learning neural network;

acquiring path planning data of the wave glider or path planning data of an underwater vehicle;

inputting the path planning data of the wave glider or the path planning data of the underwater vehicle as constraint conditions into the deep learning neural network; and updating parameters of the deep learning neural network by multiple iterations and learning to obtain the trained deep neural network model;

acquiring, by the shore-based monitoring center, real-time navigation data of the wave glider, real-time navigation data and predetermined shipping track data of the underwater vehicle;

obtaining, by the shore-based monitoring center, a set of optimized path planning schemes of the wave glider by adopting the trained deep neural network model according to the real-time navigation data of the wave glider, the real-time navigation data and the predetermined shipping track data of the underwater vehicle; wherein obtaining the set of optimized path planning schemes of the wave glider by adopting the trained deep neural network model according to the real-time navigation data of the wave glider, the real-time navigation data and the predetermined shipping track data of the underwater vehicle comprises:

constructing a test set of the wave glider according to the real-time navigation data of the wave glider;

constructing a test set of underwater vehicle according to the real-time navigation data and the predetermined shipping track data of the underwater vehicle; and inputting the test set of the wave glider and the test set of the underwater vehicle into the trained deep neural network model to obtain the set of optimized path planning schemes of the wave glider;

sending the set of optimized path planning schemes of the wave glider determined at the shore-based monitoring center to the wave glider via a GPS or a cloud end;

acquiring real-time data of the wave glider and constraint data of the wave glider by the wave glider; wherein the real-time data comprises actual navigation data of the wave glider, on-site sea condition information and actual navigation data of the underwater vehicle collected by the wave glider in real time, and the constraint data comprises a distance between the wave glider and the underwater vehicle, and underwater acoustic communication conditions;

determining, by the wave glider, an optimal path planning scheme of the wave glider among the set of optimized path planning schemes of the wave glider by adopting the deep learning neural network, according to the real-time data of the wave glider and the constraint data of the wave glider, wherein the optimal path planning scheme implements a shortest distance between the wave glider and the underwater vehicle; wherein determining the optimal path planning scheme of the wave glider among the set of optimized path planning schemes of the wave glider by adopting the deep learning neural network, according to the real-time data of the wave glider, and the constraint data of the wave glider comprises;

taking the real-time data of the wave glider as latest real-time data;

taking the constraint data of the wave glider as latest constraint conditions; and based on the latest real-time data and the latest constraint conditions, carrying out path planning scheme selection from the set optimized path planning schemes of the wave glider by utilizing the deep learning neural network to obtain the optimal path planning scheme of the wave glider; and controlling, by the wave glider, an attitude and a velocity of the wave glider to make the wave glider sail according to the optimal path planning scheme of the wave glider.

2. The method for path planning of the wave glider according to claim 1, further the method comprising:

sending the optimal path planning scheme of the wave glider determined by the wave glider to the shore-based monitoring center via a GPS or a cloud end.

3. A system for path planning of a wave glider, comprising:

a historical navigation data acquisition module of a shore-based monitoring center configured to acquire historical navigation data of the wave glider and a underwater vehicle;

a training module of the shore-based monitoring center configured to fit the historical navigation data nonlinearly by adopting a deep learning neural network to obtain a trained deep neural network model; wherein the training module of the shore-based monitoring center comprises;

a first input unit configured to input the historical navigation data as a training set into the deep learning neural network;

an acquisition unit configured to acquire path planning data of the wave glider or path planning data of the underwater vehicle;

a second input unit configured to input the path planning data of the wave glider or the path planning data of the underwater vehicle as a constraint conditions into the deep learning neural network; and a training unit configured to update parameters of the deep learning neural network by multiple iterations and learning to obtain a trained deep neural network model;

a data acquisition module of the shore-based monitoring center configured to acquire real-time navigation data of the wave glider, real-time navigation data and predetermined shipping track data of the underwater vehicle;

a determination module of the shore-based monitoring center for a set of optimized path planning schemes of the wave glider configured to obtain the set of optimized path planning schemes of the wave glider by adopting the trained deep neural network model according to the real-time navigation data of the wave glider, the real-time navigation data and the predetermined shipping track data of the underwater vehicle; wherein the determination module of the shore-based monitoring center for the set of optimized path planning schemes of the wave glider comprises;

a construction unit for a wave glider test set configured to construct a test set of the wave glider according to the real-time navigation data of the wave glider;

a construction unit for an underwater vehicle test set configured to construct a test set of the underwater vehicle according to the real-time navigation data and the predetermined shipping track data of the underwater vehicle; and a determination unit for a set of optimized path planning schemes of the wave glider configured to input the test set of the wave glider and the test set of the underwater vehicle into the trained deep neural network model to obtain the set of optimized path planning schemes of the wave glider;

a data transmission module configured to send the set of optimized path planning schemes of the wave glider determined at the shore-based monitoring center to the wave glider via a GPS or a cloud end;

a data acquisition module of the wave glider configured to acquire real-time data of the wave glider and constraint data of the wave glider; wherein the data acquisition module of the wave glider comprises;

a real-time data acquisition unit configured to acquire the real-time data of the wave glider, wherein the real-time data comprises actual navigation data of the wave glider, on-site sea condition information and actual navigation data of the underwater vehicle collected by the wave glider in real time; and a constraint data acquisition unit configured to acquire the constraint data of the wave glider, wherein the constraint data comprises a distance between the wave glider and the underwater vehicle, and underwater acoustic communication conditions;

a determination module of the wave glider for an optimal path planning scheme of the wave glider configured to determine the optimal path planning scheme of the wave glider among the set of optimized path planning schemes of the wave glider by adopting the deep learning neural network, according to the real-time data of the wave glider and the constraint data of the wave glider, wherein the optimal path planning scheme implements a shortest distance between the wave glider and the underwater vehicle; wherein, the determination module of the wave glider for the optimal path planning scheme of the wave glider takes the real-time data of the wave glider as latest real-time data and the constraint data of the wave glider as latest constraint conditions, and, based on the latest real-time data and the latest constraint conditions, carries out path planning scheme selection from the set of optimized path planning schemes of the wave glider by utilizing the deep learning neural network to obtain the optimal path planning scheme of the wave glider; and a wave glider navigation module of the wave glider configured to control an attitude and a velocity of the wave glider to make the wave glider sail according to the optimal path planning scheme of the wave glider.

* * * * *